(12) United States Patent
Story et al.

(10) Patent No.: US 10,634,128 B1
(45) Date of Patent: Apr. 28, 2020

(54) MOISTURE CONDENSATE SEPARATOR AND METHOD OF USE THEREOF

(71) Applicant: Hennessy Industries, Inc., LaVergne, TN (US)

(72) Inventors: John Story, Murfreesboro, TN (US); T. J. Buckley, Thompson Station, TN (US)

(73) Assignee: Hennessy Industries, Inc., Lavergne, TN (US)

( * ) Notice: Subject to any disclaimer, the term of this patent is extended or adjusted under 35 U.S.C. 154(b) by 679 days.

(21) Appl. No.: 15/058,769

(22) Filed: Mar. 2, 2016

Related U.S. Application Data (60) Provisional application No. 62/127,188, filed on Mar. 2, 2015.

(51) Int. Cl.
  *F04B 39/16* (2006.01)
  *B60S 5/04* (2006.01)

(52) U.S. Cl.
  CPC .............. *F04B 39/16* (2013.01); *B60S 5/043* (2013.01)

(58) Field of Classification Search
  CPC ..................................................... B60C 25/00
  See application file for complete search history.

(56) References Cited

U.S. PATENT DOCUMENTS

| | | | |
|---|---|---|---|
| 3,527,027 A | 9/1970 | Knight et al. | |
| 4,043,353 A | 8/1977 | Shirey | |
| 4,519,819 A | 5/1985 | Frantz | |
| 4,987,919 A * | 1/1991 | Boutin | F16T 1/14 137/204 |
| 5,746,791 A * | 5/1998 | Wang | B01D 53/265 55/337 |
| 8,075,668 B2 | 12/2011 | Delmotte et al. | |
| 2003/0155055 A1* | 8/2003 | Leblanc | B60C 19/002 152/154.1 |
| 2013/0145733 A1 | 6/2013 | Cho et al. | |

FOREIGN PATENT DOCUMENTS

EP   0729776 A1   10/1995

* cited by examiner

*Primary Examiner* — Patrick Hamo
(74) *Attorney, Agent, or Firm* — Patterson Intellectual Property Law, P.C.; Ryan D. Levy; Mark A. Kilgore (57) ABSTRACT

A moisture condensate separator for use with an air compressor and a pneumatic machine includes a body, a separation assembly, and a valve assembly. The body may define an interior chamber including a condensate accumulation zone, a compressor supply inlet, a machine supply outlet, a cylinder, an auxiliary inlet, and a drain hole. The separation assembly may be located in the interior chamber and fluidly communicated with the compressor supply inlet and the machine supply outlet so as to accumulate moisture condensate in the accumulation zone. The valve assembly may include a piston movable between an open and closed position. A biasing member may bias the piston toward the closed position. Auxiliary pressure provided through the auxiliary inlet may act on the piston and move the piston to the open position, thereby allowing the accumulated moisture condensate to drain.

18 Claims, 5 Drawing Sheets

MOISTURE CONDENSATE SEPARATOR AND METHOD OF USE THEREOF

CROSS-REFERENCES TO RELATED APPLICATIONS

This application claims benefit of the following patent application which is hereby incorporated by reference: U.S. Provisional Application No. 62/127,188 filed Mar. 2, 2015, entitled "Method and Apparatus for Automatic Actuation of a Water Separator in a Compressed Air System."

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND OF THE INVENTION

The present invention relates generally to the management of liquid contaminants in compressed air systems.

More particularly, the present invention relates to moisture condensate separators for use with compressed air systems and to methods of operating a moisture condensate separator.

Compressed air systems can become severely contaminated when the simple duty of draining liquids that accumulated in compressor tanks and filters is neglected. Failure to drain the liquids may lead to catastrophic failure of the compressed air system.

Conventional solutions to the problem of liquid accumulation in compressed air systems include the use of air-water separator devices that are manually actuated. These manually actuated separators may be unreliable because they require the use of a sight glass to determine when moisture has accumulated. Also, a user must remember to inspect the sight glass and activate the device often enough to avoid overfilling of the separator.

Air-water separators that are float actuated may also be undesirable because the liquid orifice size must be small enough to open at high pressure. A small orifice may clog easily.

Accordingly it would be beneficial to provide a method and device to manage moisture condensate in a compressed air system that is relatively inexpensive, reliable, and automatic in operation.

BRIEF SUMMARY OF THE INVENTION

In some embodiments, a moisture condensate separator is provided that may be periodically actuated automatically. This actuation may occur coincidentally with actuation of an auxiliary line of a pneumatic machine to operate an auxiliary function of the machine. In one embodiment, a drain valve may be pneumatically activated when a user operates a bead blaster of a tire changing machine. Such an auxiliary function is performed periodically during routine machine operation and would, therefore, provide periodic draining of the moisture condensate separator automatically. This periodic draining would prevent moisture condensate buildup from exceeding an acceptable level, as well as avoid keeping the drain passage open continuously.

In one embodiment, the present invention relates to a moisture condensate separator for use with an air compressor including a compressor supply line and a pneumatic machine having a machine supply line and an auxiliary line. The separator may include a body. The body may have an interior chamber defined in the body, the interior chamber including a condensate accumulation zone. A compressor supply inlet may be defined in the body. The compressor supply inlet may be configured to fluidly connect the interior chamber with the compressor supply line. A machine supply outlet may be defined in the body. The machine supply outlet may be configured to fluidly connect the interior chamber with the machine supply line. A cylinder may also be defined in the body. An auxiliary inlet may be defined in the body. The auxiliary inlet may be configured to fluidly connect the cylinder with the auxiliary line. A drain hole may be defined in the body. The drain hole may be in selective fluid communication with the cylinder and the accumulation zone.

The separator may also include a separation assembly located in the interior chamber and fluidly communicated with the compressor supply inlet and the machine supply outlet. The separation assembly may be configured to accumulate moisture condensate in the accumulation zone. The separator may include a valve assembly. The valve assembly may include a piston disposed in the cylinder. The piston may be movable between a closed position isolating the drain hole from the accumulation zone and an open position allowing the drain hole to fluidly communicate with the accumulation zone. The valve assembly may also include a biasing member disposed in the cylinder. The biasing member may be configured to provide a biasing force to bias the piston toward the closed position. The auxiliary inlet may communicate with a side of the piston such that auxiliary pressure acting on the piston opposes the biasing force of the biasing member and must overcome the biasing force to move the piston to the open position.

Another embodiment may further include the compressor supply inlet fluidly connected with the compressor supply line, the machine supply outlet fluidly connected with the machine supply line, and the auxiliary inlet fluidly connected with the auxiliary line.

In still another embodiment, the pneumatic machine may be a tire changing machine.

A further embodiment may include the tire changing machine having a bead blaster in fluid communication with the auxiliary line.

In yet another embodiment, the biasing member may be a helical spring.

In another alternative embodiment, the valve assembly may have at least one seal disposed on the piston.

In another embodiment, the present invention relates to a pneumatically operated machine for use with a compressed air system including a compressor supply line. The machine may have a main air supply line to power a first function of the machine, an auxiliary air supply line to power an auxiliary function of the machine, and a moisture condensate separator assembly. The moisture condensate separator assembly may include a housing. The housing may have an interior chamber defined in the housing. A condensate separator may be located in the interior chamber. A main inlet port may be defined in the housing. The main inlet port may be in fluid communication with the condensate separator and the compressor supply line. A main outlet port may be defined in the housing. The main outlet port may be in fluid communication with the condensate separator and the main air supply line. A drain passage may also be defined in the housing. The drain passage may be in selective fluid communication with the interior chamber. The moisture condensate separator assembly may also include a pneumatically actuated drain valve disposed in the drain passage. The drain valve may be biased to a closed position when unactuated and moved to an open position when a threshold force is provided by the auxiliary air supply line.

In a further embodiment, the pneumatically operated machine may be a tire changing machine.

In yet another embodiment, the first function of the machine may include operation of a tire inflator.

In a further embodiment, the auxiliary function of the machine may include operation of a bead blaster.

In still another embodiment, the pneumatically actuated drain valve may include a plunger. The plunger may be movable between the closed position blocking the drain passage and the open position allowing the drain passage to fluidly communicate with the interior chamber.

An alternative embodiment may further include the drain valve having a spring configured to bias the plunger toward the closed position.

In another embodiment, the drain valve may have at least one gasket disposed on the plunger. The gasket may be configured to seal and separate the auxiliary air supply line from the drain passage.

The present invention also relates, in one embodiment, to a method of operating a moisture condensate separator. The method may include flowing a main compressed air stream into a main inlet port of the separator, through a separation element, and out a main outlet port of the separator; separating moisture from the main compressed air stream with the separation element; accumulating moisture condensate in an accumulation chamber of the separator when a drainage valve is in a closed position; flowing an auxiliary compressed air stream into an auxiliary inlet port of the separator, thereby moving the drainage valve to an open position when the auxiliary compressed air stream provides a threshold force; and draining the moisture condensate from the accumulation chamber when the drainage valve is in the open position.

Another embodiment of the method may include flowing the auxiliary compressed air stream when an auxiliary function of a pneumatically operated machine is operated.

Yet another embodiment may include flowing the main compressed air stream from an air compressor to the separator.

Still another embodiment may include flowing the main compressed air stream from the separator to a pneumatically operated machine, thereby operating a main function of the machine.

A further embodiment may include inflating a tire with the main compressed air stream.

A further still embodiment may include operating a bead blaster with the auxiliary compressed air stream.

It is to be understood that both the foregoing general description and the following detailed description of embodiments of the invention are intended to provide an overview or framework for understanding the nature and character of the invention as it is claimed. The description serves to explain the principles and operations of the claimed subject matter. Other and further features and advantages of the present invention will be readily apparent to those skilled in the art upon a reading of the following disclosure.

DETAILED DESCRIPTION OF THE INVENTION

Reference now will be made in detail to embodiments of the present invention, one or more drawings of which are set forth herein below. Each drawing is provided by way of explanation of the present disclosure and is not a limitation. It will be apparent to those skilled in the art that various modifications and variations can be made to the teachings of the present disclosure without departing from the scope of the invention. For instance, features illustrated or described as part of one embodiment, can be used with another embodiment to yield a still further embodiment.

Thus, it is intended that the present invention covers such modifications and variations as come within the scope of the appended claims and their equivalents. Other objects, features and aspects of the present invention are disclosed in or are obvious from the following detailed description. It is to be understood by one of ordinary skill in the art that the present discussion is a description of exemplary embodiments only and is not intended as limiting the broader aspects of the present invention.

Figure 1:
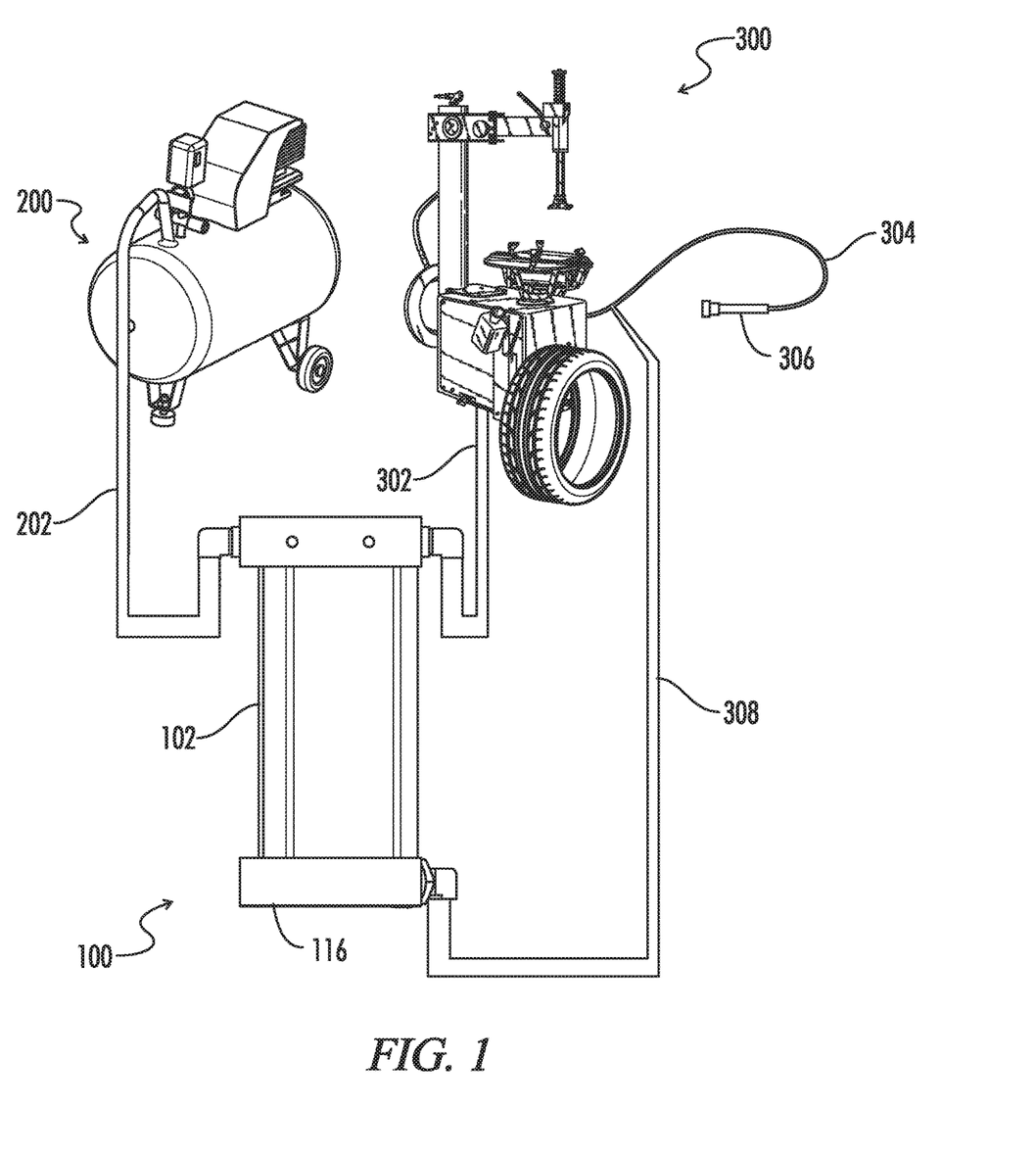
FIG. 1 is a diagrammatic view of one embodiment of the moisture condensate separator of the present invention connected to a pneumatic tire changing machine and an air compressor.

FIG. 1 shows a moisture condensate separator 100 for use with a compressed air system (such as an air compressor) 200 including a compressor supply line 202 and a pneumatic machine (or pneumatically operated machine) 300 including a machine supply line (or main air supply line) 302 to power a first machine function and an auxiliary line (or auxiliary air supply line) 304 to power an auxiliary machine function. The pneumatic machine 300 may be any machine utilizing compressed air for at least one machine function. One example of such a pneumatic machine 300 is a tire changing machine wherein the first function may be operation of a tire inflator.

The pneumatic machine 300 may further include an auxiliary device 306 connected to the auxiliary line 304. One example of an auxiliary device 306 is a bead blaster. A bead blaster (or inflation blaster) in such an embodiment would use the compressed air from the auxiliary line 304 to direct a stream or blast of high pressure air into or toward a tire located on the tire changing machine. This stream or blast of high pressure air may assist in seating the tire bead against an associated wheel rim so the tire can be inflated.

In an alternative embodiments, the air delivered to an auxiliary inlet 114 (FIG. 2) may be supplied by way of an exhaust port on a tire bead loosening cylinder, any pneumatic valve within a pneumatic machine activated during a particular operation of the machine, a valve within a pneumatic machine opened using a drain activation button or switch coupled to the valve, and the like.

Figure 2:
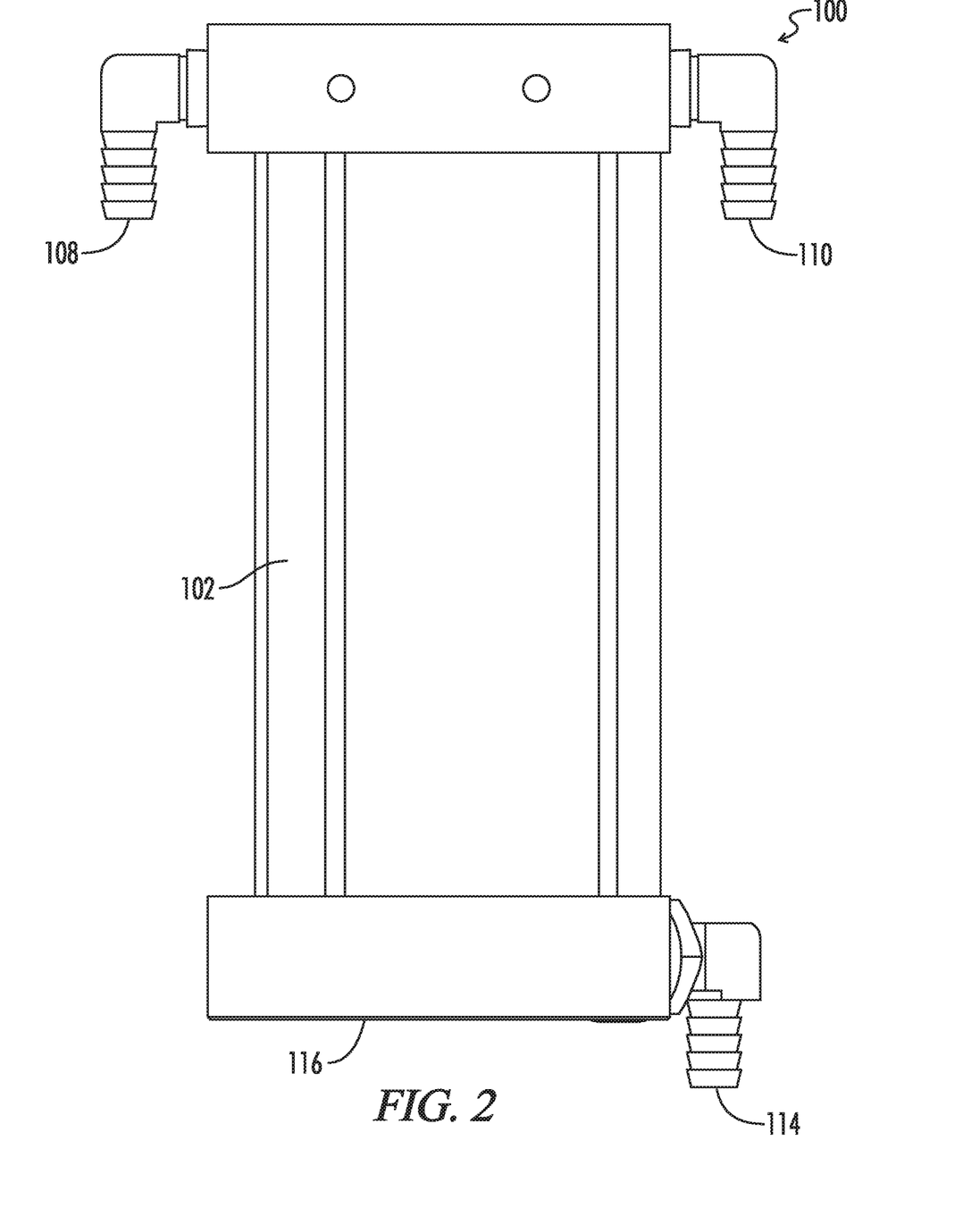
FIG. 2 is a side view of the moisture condensate separator of FIG. 1.
Figure 3:
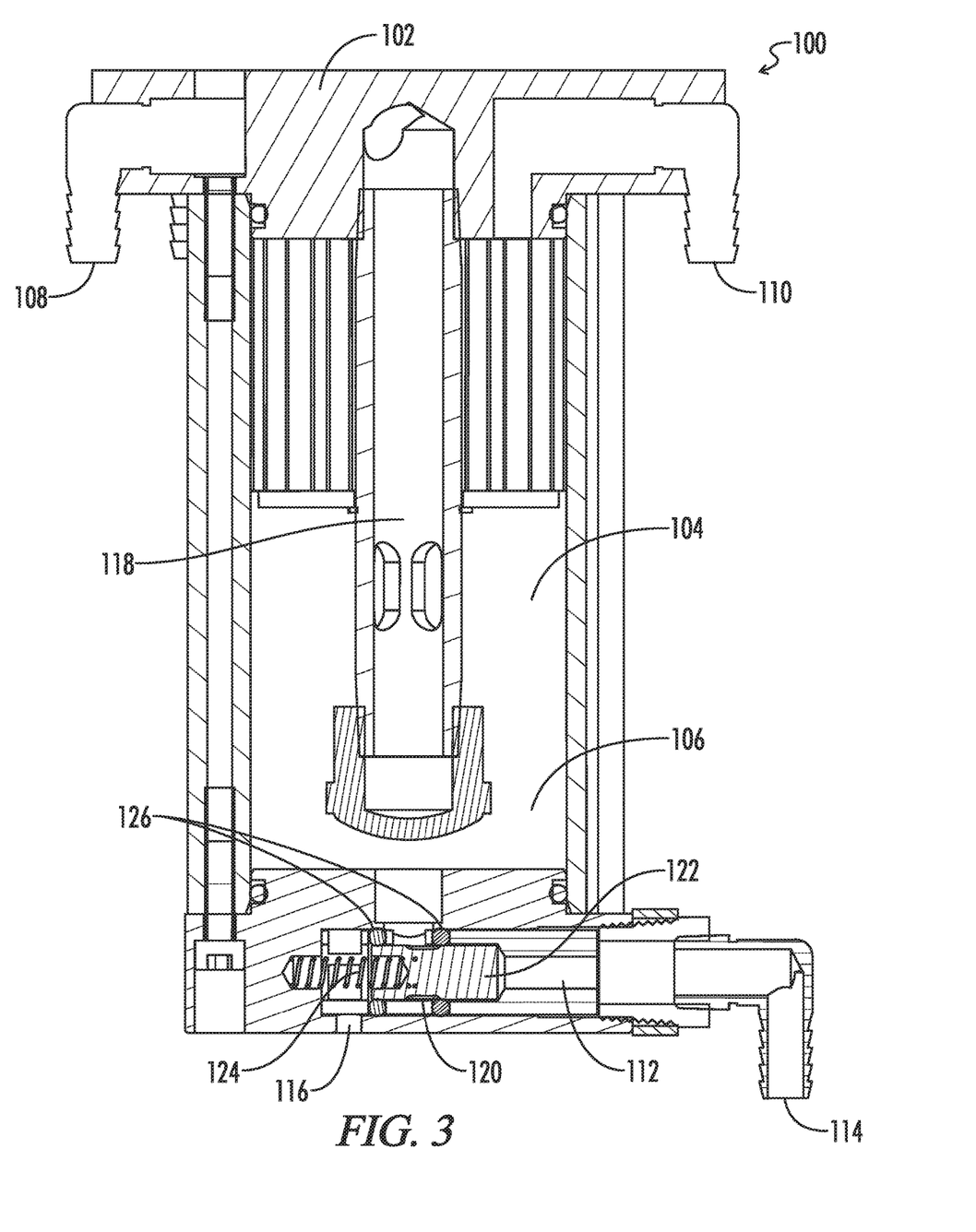
FIG. 3 is a cross-sectional side view of the moisture condensate separator of FIG. 1 with the valve assembly in the closed position.
Figure 4:
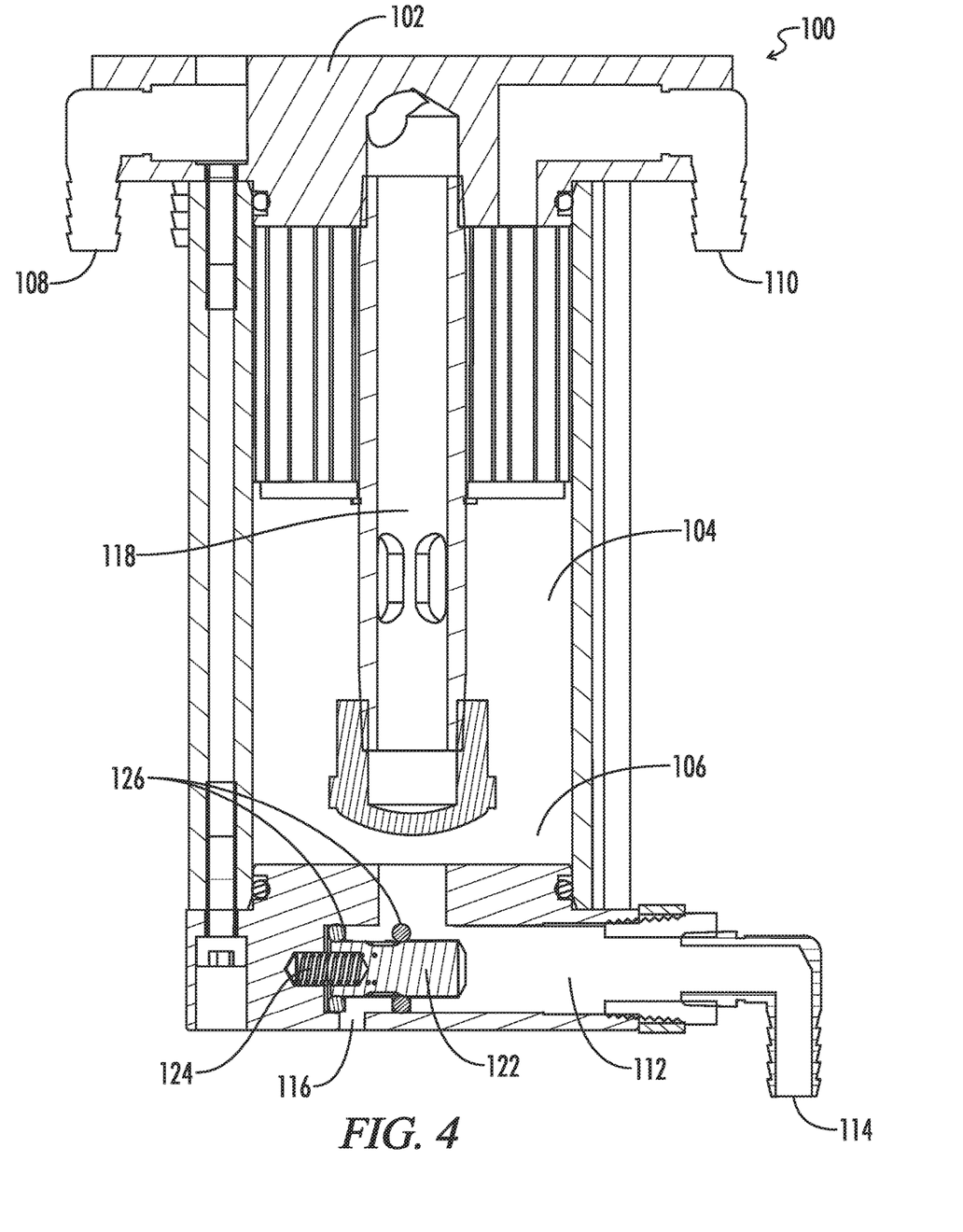
FIG. 4 is a cross-sectional side view of the moisture condensate separator of FIG. 1 with the valve assembly in the open position.
Figures 5, 6:
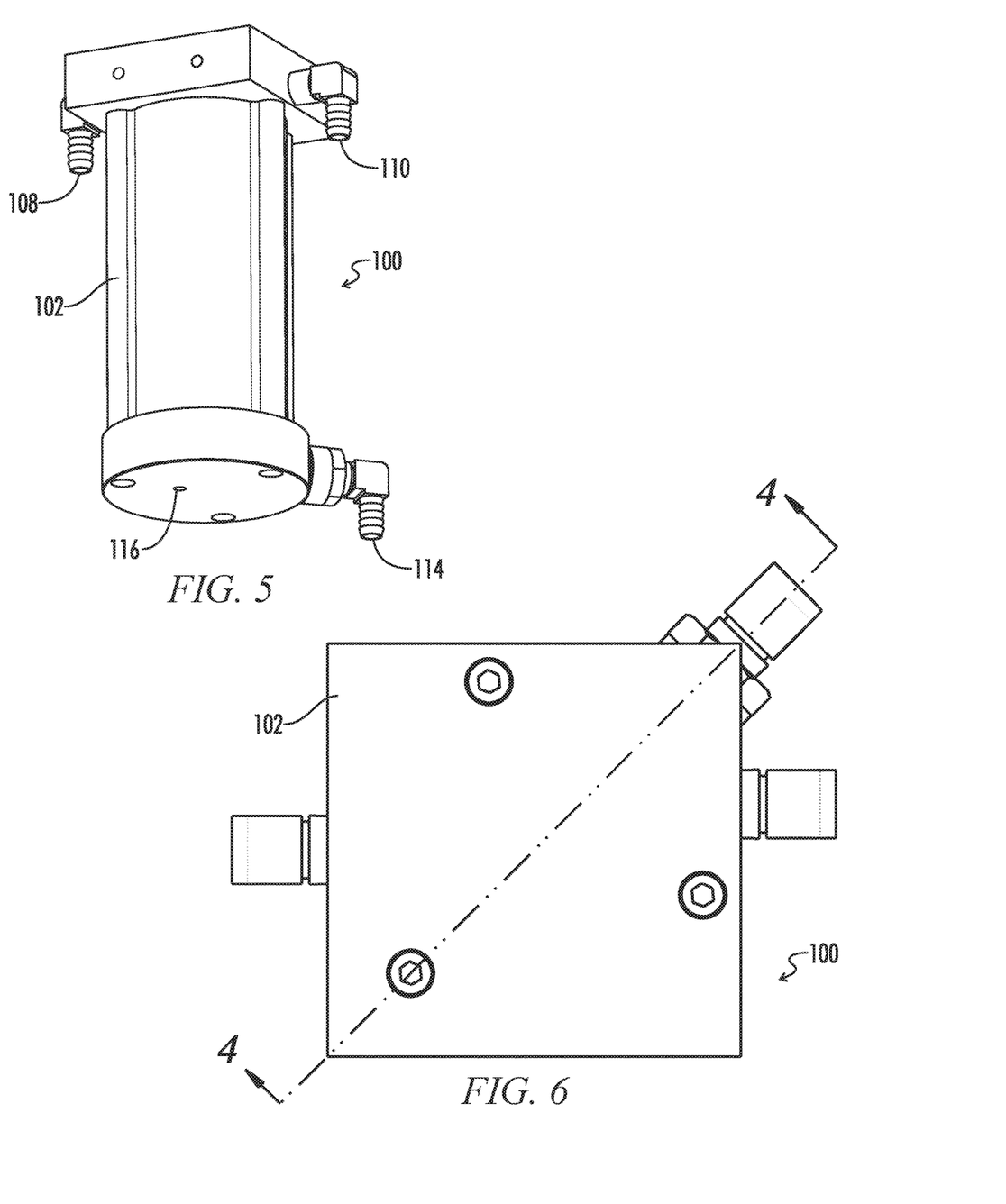
FIG. 5 is a perspective view of the moisture condensate separator of FIG. 1.
FIG. 6 is a top plan view of the moisture condensate separator of FIG. 1.

As best seen in FIGS. 2-4, the moisture condensate separator 100 includes a body (or housing) 102. The body 102 may define an interior chamber 104 (FIG. 3), the interior chamber 104 including a condensate accumulation zone 106, a compressor supply inlet (or main inlet port) 108, a machine supply outlet (or main outlet port) 110, a cylinder 112, an auxiliary inlet 114, and a drain hole (or drain passage) 116.

Each chamber, zone, inlet, outlet, and hole may be of any shape including, but not limited to, passages of circular, square, rectangular, elliptical, and other cross-sections. Similarly, the cylinder 112 may alternatively be a passage of any shape including, but not limited to, those mentioned above.

The compressor supply inlet 108 may fluidly connect the interior chamber 104 with the compressor supply line 202 (shown in FIG. 1). The machine supply outlet 110 may fluidly connect the interior chamber 104 with the machine supply line 302 (shown in FIG. 1). The auxiliary inlet 114 may fluidly connect the cylinder 112 with the auxiliary line 304. In some embodiments, the auxiliary inlet 114 may fluidly connect the cylinder 112 with the auxiliary line 304 through a secondary line 308 that branches off from the auxiliary line (shown in FIG. 1). In certain examples, the secondary line 308 may share the same supply fitting with the auxiliary line 304, or the secondary line may be attached to the auxiliary line with any of a T-fitting, Y-fitting, and the like. The moisture condensate separator 100 may be implemented as part of a new wheel service machine or in retrofit applications. In certain examples, each fluid connection between the various inlets/outlets/ports and the various air lines may be connected by way of any variety of clamps, screw fittings, quick-connect fittings, and the like. The drain hole 116 may be in selective fluid communication with the cylinder 112 and the accumulation zone 106.

A separation assembly 118 (FIGS. 3 and 4) may be located in the interior chamber 104. The separation assembly 118 may be fluidly communicated with the compressor supply inlet 108 and the machine supply outlet 110. The separation assembly 118 may also be configured to accumulate moisture condensate in the accumulation zone 106.

The moisture condensate separator 100 may further include a valve assembly (or pneumatically activated drain valve) 120. As shown in FIG. 3, the valve assembly 120 may be biased to a closed position when unactuated. As shown in FIG. 4, the valve assembly 120 may be moved to an open position when a threshold force is provided by the auxiliary line 304. When the valve assembly 120 is in the open position, the moisture condensate may leave the accumulation zone 106 via the drain hole 116 by the interior pressure of the moisture condensate separator 100 and/or by gravity.

The valve assembly 120 may include a piston (or plunger) 122 disposed in the cylinder 112. The piston 122 may be movable between the closed position isolating the drain hole 116 from the accumulation zone 106 and the open position allowing the drain hole to fluidly communicate with the accumulation zone. The piston 122 may be of any appropriate shape including, but not limited to, a cylinder, a sphere, an ovoid, a cube, a rectangular prism, and the like.

The valve assembly 120 may also include a biasing member 124 disposed in the cylinder 112. The biasing member 124 may be configured to provide a biasing force to bias the piston 122 toward the closed position. The auxiliary inlet 114 may communicate with a side of the piston 122 such that auxiliary pressure acting on the piston opposes the biasing force of the biasing member 124. The auxiliary pressure acting on the piston 122 must overcome the biasing force to move the piston to the open position (shown in FIG. 4).

Embodiments of the moisture condensate separator 100 may include at least one biasing member 124 of any contemplated design known in the art. The biasing member 124 may, in non-limiting examples, include a helical spring, flat spring, gas spring, resilient material, and the like. Alternative embodiments may include the valve assembly biased to the closed position by the force of gravity.

Some embodiments of the moisture condensate separator 100 may include a valve assembly 120 wherein at least one seal (or gasket) 126 may be disposed on the piston 122. In such embodiments, the seal 126 may be made of any shape and material configured to ensure an appropriate degree of separation of the auxiliary inlet 114 from the accumulation zone 106 or the drain hole 116. One non-limiting example of such a material may include any polymer or combination of polymers.

The present invention is also directed to a method of operating a moisture condensate separator 100. One embodiment of a method of operating the moisture condensate separator 100 may include flowing a main compressed air stream into a main inlet port 108 of the separator, through a separation element 118, and out a main outlet port 110 of the separator; separating moisture from the main compressed air stream with the separation element; accumulating moisture condensate in an accumulation chamber 106 of the separator when a drainage valve 120 is in a closed position; flowing an auxiliary compressed air stream into an auxiliary inlet port 114 of the separator, thereby moving the drainage valve to an open position when the auxiliary compressed air stream provides a threshold force; and draining the moisture condensate from the accumulation chamber when the drainage valve is in the open position.

In some embodiments, the auxiliary compressed air stream may flow when an auxiliary function of a pneumatically operated machine 300 is operated. Also, the method may include flowing the main compressed air stream from an air compressor 200 to the separator 100. The main compressed air stream may flow from the separator 100 to a pneumatically operated machine 300, thereby operating a main function of the machine. In some embodiments, the main function of the machine 300 is inflating a tire. Some embodiments include using the auxiliary compressed air stream to operate a bead blaster of the machine 300.

The above disclosure is capable of numerous rearrangements, modifications, and substitutions. Thus, although there have been described particular embodiments of the present invention of a moisture condensate separator and method of use thereof, it is not intended that such references be construed as limitations upon the scope of this invention except as set forth in the following claims.

The invention claimed is:

1. A moisture condensate separator for use with an air compressor having a compressor supply line and a tire changing machine having a machine supply line and an auxiliary line, the separator comprising:
    a body including
        an interior chamber defined in the body, the interior chamber including a condensate accumulation zone,
        a compressor supply inlet defined in the body, the compressor supply inlet configured to fluidly connect the interior chamber with the compressor supply line,
        a machine supply outlet defined in the body, the machine supply outlet configured to fluidly connect the interior chamber with the machine supply line,
        a cylinder defined in the body,
        an auxiliary inlet defined in the body, the auxiliary inlet configured to fluidly connect the cylinder with the auxiliary line, and a drain hole defined in the body, the drain hole in selective fluid communication with the cylinder and the accumulation zone;
a separation assembly located in the interior chamber and fluidly communicated with the compressor supply inlet and the machine supply outlet, the separation assembly configured to accumulate moisture condensate in the accumulation zone; and
a valve assembly including a piston disposed in the cylinder, the piston being movable between a closed position isolating the drain hole from the accumulation zone and an open position allowing the drain hole to fluidly communicate with the accumulation zone, and
a biasing member disposed in the cylinder, the biasing member configured to provide a biasing force to bias the piston toward the closed position, and
wherein the auxiliary inlet communicates with a side of the piston such that the auxiliary line supplies pressure acting on the piston, the pressure opposing the biasing force of the biasing member and overcoming the biasing force to move the piston to the open position.

2. The separator of claim 1, further comprising:
the compressor supply inlet fluidly connected with the compressor supply line;
the machine supply outlet fluidly connected with the machine supply line; and
the auxiliary inlet fluidly connected with the auxiliary line.

3. The separator of claim 1, wherein the tire changing machine includes a bead blaster in fluid communication with the auxiliary line.

4. The separator of claim 1, wherein the biasing member includes a helical spring.

5. The separator of claim 1, wherein the valve assembly further includes at least one seal disposed on the piston.

6. A pneumatically operated machine for use with a compressed air system including a compressor supply line, the machine comprising:
a main air supply line to power a first function of the machine;
an auxiliary air supply line to power an auxiliary function of the machine; and
a moisture condensate separator assembly including a housing including:
an interior chamber defined in the housing,
a condensate separator located in the interior chamber,
a main inlet port defined in the housing, the main inlet port in fluid communication with the condensate separator and the compressor supply line,
a main outlet port defined in the housing, the main outlet port in fluid communication with the condensate separator and the main air supply line, and
a drain passage defined in the housing, the drain passage in selective fluid communication with the interior chamber; and
a pneumatically actuated drain valve disposed in the drain passage, the drain valve biased to a closed position when unactuated and moved to an open position when a threshold force is provided by the auxiliary air supply line.

7. The machine of claim 6, wherein the pneumatically operated machine includes a tire changing machine.

8. The machine of claim 7, wherein the first function of the machine includes operation of a tire inflator.

9. The machine of claim 7, wherein the auxiliary function of the machine includes operation of a bead blaster.

10. The machine of claim 6, wherein the pneumatically actuated drain valve includes a plunger, the plunger being movable between the closed position blocking the drain passage and the open position allowing the drain passage to fluidly communicate with the interior chamber.

11. The machine of claim 10, wherein the drain valve includes a spring configured to bias the plunger toward the closed position.

12. The machine of claim 10, wherein the drain valve includes at least one gasket disposed on the plunger, the gasket configured to sealingly separate the auxiliary air supply line from the drain passage.

13. A method of operating a moisture condensate separator for use with an air compressor having a compressor supply line and a tire changing machine having a machine supply line and an auxiliary line, the separator comprising:
a body including
an interior chamber defined in the body, the interior chamber including a condensate accumulation zone,
a compressor supply inlet defined in the body, the compressor supply inlet configured to fluidly connect the interior chamber with the compressor supply line,
a machine supply outlet defined in the body, the machine supply outlet configured to fluidly connect the interior chamber with the machine supply line, a cylinder defined in the body,
an auxiliary inlet defined in the body, the auxiliary inlet configured to fluidly connect the cylinder with the auxiliary line, and
a drain hole defined in the body, the drain hole in selective fluid communication with the cylinder and the accumulation zone; a separation assembly located in the interior chamber and fluidly communicated with the compressor supply inlet and the machine supply outlet, the separation assembly configured to accumulate moisture condensate in the accumulation zone; and
a valve assembly including a piston disposed in the cylinder, the piston being movable between a closed position isolating the drain hole from the accumulation zone and an open position allowing the drain hole to fluidly communicate with the accumulation zone, and
a biasing member disposed in the cylinder, the biasing member configured to provide a biasing force to bias the piston toward the closed position, and
wherein the auxiliary inlet communicates with a side of the piston such that the auxiliary line supplies pressure acting on the piston, the pressure opposing the biasing force of the biasing member and overcoming the biasing force to move the piston to the open position, the method comprising:
(a) flowing a main compressed air stream into the supply inlet of the separator, through a separation element, and out the supply outlet of the separator;
(b) separating moisture from the main compressed air stream with the separation element;
(c) accumulating moisture condensate in the accumulation zone of the separator when the valve assembly is in a closed position;
(d) flowing an auxiliary compressed air stream into the auxiliary inlet of the separator, thereby moving the valve assembly to an open position when the auxiliary compressed air stream provides a threshold force; and
(e) draining the moisture condensate from the accumulation zone when the valve assembly is in the open position.

14. The method of claim 13, further comprising flowing the auxiliary compressed air stream when an auxiliary function of the tire changing machine is operated.

15. The method of claim 13, further comprising flowing the main compressed air stream from the air compressor to the separator.

16. The method of claim 13, further comprising flowing the main compressed air stream from the separator to the tire changing machine, thereby operating a main function of the machine.

17. The method of claim 16, further comprising inflating a tire with the main compressed air stream.

18. The method of claim 17, further comprising operating a bead blaster with the auxiliary compressed air stream.

\* \* \* \* \*